United States Patent [19]

Cooley

[11] Patent Number: 4,586,941
[45] Date of Patent: May 6, 1986

[54] SEWER ODOR ADSORBER

[75] Inventor: Richard L. Cooley, San Mateo, Calif.

[73] Assignee: Calgon Carbon Corporation, Pittsburgh, Pa.

[21] Appl. No.: 698,213

[22] Filed: Feb. 4, 1985

[51] Int. Cl.$^4$ .............................................. B01D 53/04
[52] U.S. Cl. ..................................... 55/385 R; 55/387
[58] Field of Search ...................... 55/387, 502, 385 R

[56] References Cited

U.S. PATENT DOCUMENTS

| | | |
|---|---|---|
| 154,645 | 9/1874 | Chase . |
| 2,721,619 | 10/1955 | Cheairs . |
| 2,839,157 | 6/1958 | Schuster . |
| 3,377,784 | 4/1968 | Walker . |
| 3,385,196 | 5/1968 | Messen-Jaschin . |
| 3,475,885 | 11/1969 | Kline . |
| 3,589,863 | 6/1971 | Frevel et al. . |
| 4,026,688 | 5/1977 | Patterson . |
| 4,072,479 | 2/1985 | Sinha et al. . |
| 4,072,480 | 2/1978 | Wagner . |
| 4,201,663 | 5/1980 | Rollag et al. . |
| 4,350,502 | 9/1982 | Spatola . |

FOREIGN PATENT DOCUMENTS 509925 3/1952 Belgium .

Primary Examiner—Bernard Nozick
Attorney, Agent, or Firm—Reed Smith Shaw & McClay

[57] ABSTRACT

An adsorption apparatus, containing activated carbon, which fits into standard manholes of various sizes and allows sewer gases driven by a positive pressure to vent through the activated carbon, is described. The odor associated with the sewer gas is reduced or eliminated by the activated carbon contained in said apparatus.

6 Claims, 2 Drawing Figures

SEWER ODOR ADSORBER

BACKGROUND OF THE INVENTION

The present invention describes an apparatus which, when inserted into a standard manhole of any of a number of various sizes, reduces or eliminates the odors associated with sewer gases which are typically vented to the atmosphere from the manhole.

Malodorous gaseous compounds, especially sulfur-containing compounds, are especially prevalent in municipal sewer systems. These malodorous compounds include hydrogen sulfide, methyl mercaptan, organic sulfides, amines and other nitrogen containing compounds.

Activated carbon, especially an activated carbon impregnated with a reagent which is reactive toward malodorous compounds, is useful in adsorbing malodorous gaseous compounds such as those associated with sewerage. One such impregnated carbon is the NaOH/-moisture impregnated carbon described in Sinha et al, U.S. Pat. No. 4,072,479 which is herein incorporated by reference.

The use of an impregnated activated carbon such as that described in Sinha et al in the adsorber of the present invention will effectively reduce or totally eliminate odors associated with sewer gases venting from manholes containing the adsorption apparatus presently described and claimed.

U.S. Pat. No. 154,645 discloses sewer ventilators which occupy about half of the area of the sewer opening so that no back pressure is maintained in the sewer. Thus, all of the sewer gas to be treated is not forced through an adsorbent bed, as required by the instant invention, by a positive sewer pressure.

U.S. Pat. No. 3,377,784 is directed to the use of portable manhole filter assemblies on transporation tanks.

U.S. Pat. No. 3,475,885 is directed to a retainer used in sewer line vent pipes to purify escaping gases.

SUMMARY OF THE INVENTION

An adsorption apparatus is described. This apparatus, which fits into standard manholes of various sizes, preferably contains about 10 to 50 pounds of activated carbon and is held in place by a standard manhole cover. The apparatus relies on a positive sewer pressure to drive all of the sewer gas to be treated through the apparatus. Use of this adsorber reduces or eliminates odors from sewer gases venting from the manhole.

DETAILED DESCRIPTION

Traditionally, sewer gases have been allowed to vent freely through manhole covers, much to the dismay of pedestrians. Early attempts at eliminating sewerage odors centered on chemical treatment of the sewerage and/or adsorption of odors in the main sewer lines.

This invention is directed to a compact adsorption apparatus which is designed to fit into standard manholes of various sizes, including but not limited to 22", 23", 24", 25", 26", 27", 28", 29", 30", 31", 32", 33", 34", 35" and 36" outside diameter manholes, thereby eliminating sewer odors at the point nearest to public contact. This invention relies on a positive sewer pressure to drive all of the sewer gas to be treated through the apparatus.

The present invention describes an adsorption apparatus which comprises: (1) a manhole adapter and (2) an adsorption means. This combination of elements seals a manhole such that all malodorous gases to be treated must pass through the activated carbon, where they are adsorbed.

This invention is preferably directed to a sewer gas odor adsorption apparatus comprising (1) a manhole adapter; and (2) an adsorption means containing activated carbon which is supported by said manhole adapter, wherein the positive pressure of the sewer gas being treated drives all of the gas to be treated through said apparatus, thereby purifying the sewer gas.

Figure 1:
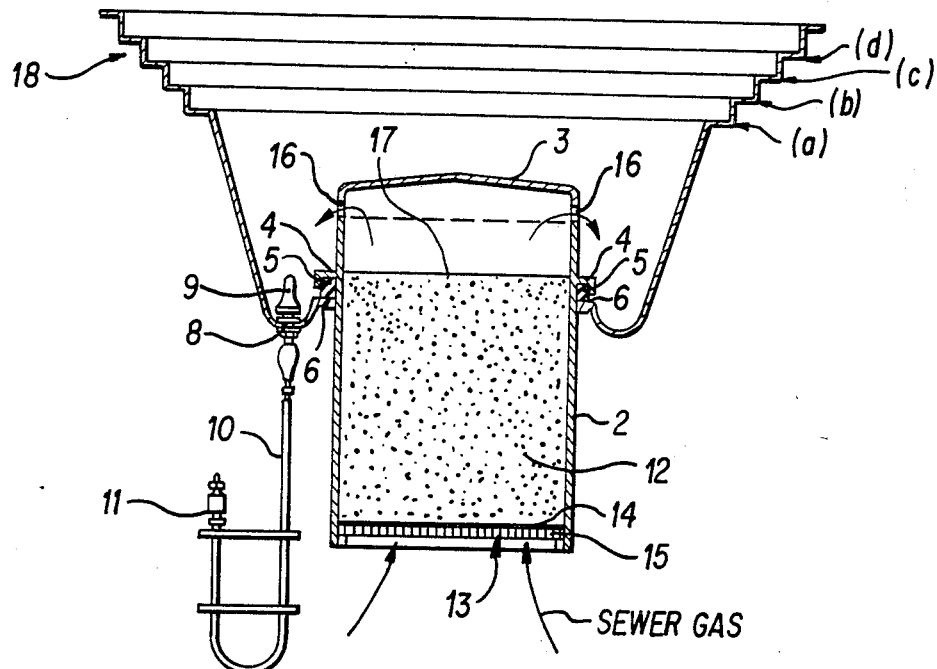
FIG. 1 shows a cross-sectional view of the adsorption apparatus and its component parts.

One embodiment of the instant invention is shown in FIG. 1, which depicts a cross-sectional view of the instant adsorption apparatus. The apparatus is inserted into a manhole, resting on the manhole lip, and is held in place by a manhole cover (not shown). The apparatus comprises two (2) main parts, the manhole adapter (1) and the adsorber means (2), which is made up by parts (3), (4), (12), (13), (14), (15), (16), and (17).

The preferred adsorber means is cylindrical and has a top (3) which fits onto the adsorber means and which is connected thereto by a connecting means. Any connection means can be used, including but not limited to the use of glue, a bonding agent, snap-type connectors or threaded connectors. The top is designed so as to prevent rainwater and the like from flowing into the adsorber means. A tongue (4) on the outer surface of the adsorber means and extending around its circumference enables the adsorber means to rest upon a sealing means (5), such as a gasket, which in turn rests upon a horizontal surface (6) of said manhole adapter. Thus, the adsorber means is inserted through a circular opening in the manhole adapter, said opening being slightly larger than the circumference of the adsorber means, being stopped by the horizontal surface forming the manhole adapter opening when the tongue of the adsorber means contacts the sealing means resting on the horizontal surface of the manhole adapter. The weight of the adsorber means is sufficient to compress sealing means (6) between the tongue of the adsorber means and the horizontal surface of the manhole adapter, thereby sealing the space between the adsorber means and the manhole adapter to the flow or passage of air, gas, water and the like.

From the horizontal surface surrounding the opening in the manhole adapter through which the adsorber means is inserted, and upon which the weight of the adsorber means ultimately rests, the surface of the manhole adapter slopes downward to form a trough (7) between the horizontal surface and the outer wall of the manhole adapter. The trough thus surrounds the adsorption means, and, preferably, comprises the lowest inner surface of the manhole adapter, thereby enabling it to collect rainwater and the like which enters the manhole adapter through openings in the manhole cover above the apparatus.

The trough (7) in said manhole adapter contains at least one orifice (8) through which collected rainwater and the like can pass. Preferably, this orifice is covered by a septa (9), or screen, which prevents passage of solid materials through said orifice. Upon passage of rainwater or the like through the septa (9) and orifice (8), the fluid flows into a conduit (10) which is connected to the outside surface of the manhole adapter (1) so as to collect all fluids passing through orifice (8). Alternatively, conduit (10) may be connected to said septa (9), thereby sandwiching the wall of the manhole adapter between itself and septa (9) in a manner which causes all fluids passing through orifice (8) to enter conduit (10). Any connection means may be used to attach conduit (10) to manhole adapter (1) or septa (8), including but not limited to the use of glue, a bonding agent or threaded connectors. Also, gaskets or other sealing means may be used as needed to prevent leakage. The conduit itself may be tubing such as $\frac{1}{2}"$ or $\frac{3}{4}"$ tubing, sized as necessary to carry rainwater or the like from the trough to the sewer. If multiple orifices are used, each should have septa and conduit connections. The conduit shown in FIG. 1 is U-shaped so as to properly orient check valve (11). The conduit tubing, at the end opposite from the end connected to the manhole adapter (1) or septa (8), is connected to a check valve (11). This check valve allows flow of rainwater or the like to exit conduit (10) to the sewer, but prevents flow of air, gas, water or the like from entering conduit (10) from the sewer. Thus, check valve (11) functions as a gas seal. This seal, in conjunction with sealing means (5), forces all of the sewer gas to be treated through the activated carbon adsorbant (12) contained in adsorber means (2).

The adsorber means further comprises a solid side wall which fits between the top (3) and a gas pervious bottom (13). This arrangement forms a chamber which contains activated carbon (12). The gas pervious bottom comprises a screen (14) which is sized so as to retain activated carbon (12) and to permit passage of the sewer gas to be treated through the activated carbon (12). Preferably, screen (14) rests on a structural grating (15), which supports screen (14) and activated carbon (12). The grating (15) may be connected to the side wall of adsorber means (2) by any connection means, including but not limited to the use of glue, a bonding agent or threaded connectors, or it may be an integral component of adsorber means (2).

To allow sewer gases to vent through the adsorber means, the top (3) must have at least one vent opening (16). To aid in keeping rainwater out of the adsorber means, the vent opening (16) is preferably oriented downward. FIG. 1 shows two such vent openings (16). A preferred number of vent openings (16) is four, and they should be sized so as to prevent excessive pressure buildup in the sewer.

The adsorber means may additionally comprise a top screen (17), which holds activated carbon (12) in the adsorber means and prevents it from exiting through a vent opening (16).

The top portion of the sewer adapter is preferably "stepped" (18) so as to accommodate manhole openings of various sizes. For example, the manhole adapter of FIG. 1 could be cut around its circumference at point (a) to fit a 24" opening, at point (b) for a 26" opening, at point (c) for a 28" opening and at point (d) for a 30" opening. In all instances, the top portion, after cutting, would be discarded. A plurality of steps is preferred. The horizontal surface of each step is sized so as to rest on a manhole lip of a standard-sized manhole. For a given manhole, the portion of the adaptor above the horizontal surface of the step which is sized to fit that manhole is removed and discarded.

A preferred activated carbon is an impregnated carbon, such as IVP, available from Calgon Carbon Corporation, Pittsburgh, Pa. The term "impregnated carbon" as used herein refers to activated carbon impregnated with alkali metal hydroxides, bicarbonates, carbonates, or mixtures thereof. Examples include NaOH, $NaHCO_3$, $Na_2CO_3$, KOH, $KHCO_3$ and $K_2CO_3$. The impregnated carbon may also contain from 1 to 50% moisture. The most preferred impregnated carbons are those impregnated with from 1 to 50 percent, by weight, of a mixture of from about 30 to 60 weight percent $NaHCO_3$ and from about 70 to 40 weight percent $Na_2CO_3$. Another preferred impregnated carbon is impregnated with about 4 to 50 percent, by weight, NaOH.

Generally, the instant adsorption apparatus is circular in shape, when viewed from the top. A square-shaped adsorption apparatus, or one of miscellaneous shape, may also be employed without departing from the spirit of this invention.

The adsorber means bottom (13) must be permeable to sewer gases but must also retain the activated carbon. Any gas pervious material may be employed, so long as the carbon is retained in the chamber. The preferred screen size is about 20 mesh. This mesh size holds the carbon in place and allows gas to enter the adsorber easily. Preferably, the grating openings are $\frac{1}{2}"$ by $\frac{1}{2}"$.

The adsorption apparatus of this invention is inserted into a manhole, causing it to rest on the manhole lip, and then covered and held in place by a standard manhole cover. As such, the apparatus does not extend above the surface of the sidewalk, street or ground in which the sewer being treated is located.

Figure 2:
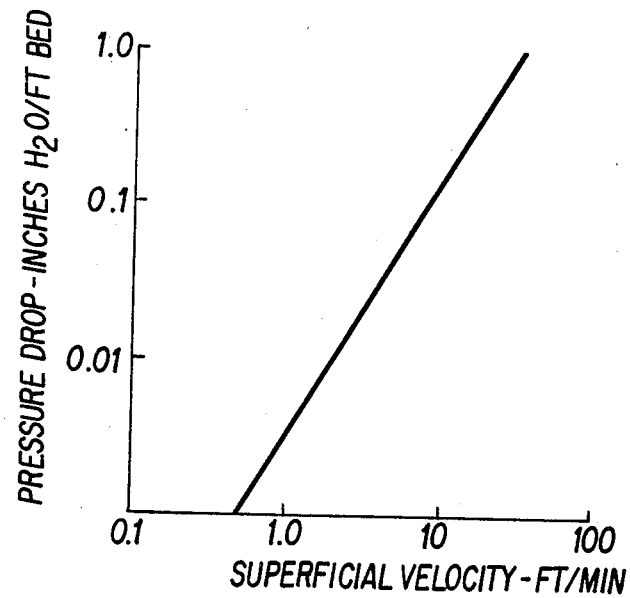
FIG. 2 shows the pressure drop characteristics of the adsorption apparatus.

FIG. 2 shows the pressure drop curve across the carbon adsorbant bed. It is essential to operation of the instant apparatus that a positive pressure drive the gas to be treated through the adsorbant bed. Thus, the positive pressure of the sewer is used to force contaminated air through the apparatus, where objectionable contaminants are trapped and stored in the carbon, allowing a purified air stream to pass through the top of the apparatus and through the manhole cover to the atmosphere. The positive pressure within the sewer line being treated is sufficient to overcome the pressure drop across the carbon bed of the instant apparatus.

Any strong, lightweight material may be used to construct the apparatus of this invention. The material should be impervious to corrosion by sewer gases. One preferred material of construction for the apparatus of this invention is fiberglass reinforced plastic. The construction material should preferably be light in weight to allow easy removal of the apparatus from the manhole and for replacement of a typical 10–50 pound charge of carbon.

Depending upon the odor problem associated with the particular sewer system, a larger or smaller apparatus chamber, holding a smaller or larger charge of activated carbon, may be employed.

Modifications of the preferred adsorber apparatus may be apparent to the skilled artist. These modifications are intended to come within the scope of this invention so long as the modified apparatus seals the manhole, forcing all of the malodorous gases to be treated to pass through activated carbon.

What is claimed is:

1. A sewer gas odor adsorption apparatus for a manhole, which is inserted into the manhole, causing it to rest on the manhole lip, and held in place by a manhole cover, which comprises: (1) a manhole adapter having a horizontal flange for resting on the manhole lip; and (2)

an adsorption means containing activated carbon which is supported by said manhole adapter providing communication with the sewer, wherein the positive pressure of the sewer gas drives all of the gas to be treated through said activated carbon, thereby purifying the sewer gas.

2. The sewer gas odor adsorption apparatus of claim 1 wherein: (a) said manhole adapter contains a trough for collecting rainwater, and wherein said rainwater exits said trough through at least one orifice, first passing through a septa and then passing through a conduit connected to a check valve, and finally passing through said check valve to the sewer being treated; (b) said adsorber means, when inserted into said manhole adapter, seals the space between said manhole adapter and adsorber means to passage of air, gas, water or the like by its own weight in conjunction with a sealing means; and (c) said adsorber means further comprises a top having at least one downwardly oriented vent opening which permits the escape of treated sewer gas while preventing rainwater and the like from entering said adsorber means.

3. The sewer gas odor adsorption apparatus of claim 2, wherein the top portion of said manhole adapter comprises a plurality of steps, thereby enabling it to be fitted into manholes of various sizes.

4. The sewer gas odor adsorption apparatus of claim 2, wherein the activated carbon is impregnated with from 0.1 to 50% of a reagent selected from the group consisting of NaOH, $NaHCO_3$, $Na_2CO_3$, KOH, $KHCO_3$, $K_2CO_3$, or mixtures thereof.

5. The sewer gas odor adsorption apparatus of claim 2, wherein the activated carbon is impregnated with from 1 to 50%, by weight, of a mixture of from about 30 to 60 weight percent $NaHCO_3$ and from about 70 to 40 weight percent $Na_2CO_3$.

6. The sewer gas odor adsorption apparatus of claim 2 wherein the activated carbon is impregnated with from about 4 to 50 percent, by weight, NaOH.

* * * * *